(12) United States Patent
Kikumoto

(10) Patent No.: US 9,036,191 B2
(45) Date of Patent: May 19, 2015

(54) PRINTING SYSTEM FOR JOB SCHEDULING AND INDICATING PRINT JOB STATE

(71) Applicant: FUJI XEROX CO., LTD., Tokyo (JP)

(72) Inventor: Takashi Kikumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/057,432

(22) Filed: Oct. 18, 2013

(65) Prior Publication Data

US 2014/0368866 A1   Dec. 18, 2014

(30) Foreign Application Priority Data

Jun. 17, 2013   (JP) .................................. 2013-126333

(51) Int. Cl.
*G06F 3/12*   (2006.01)
*G06K 15/00*   (2006.01)

(52) U.S. Cl.
CPC .................................... *G06K 15/005* (2013.01)

(58) Field of Classification Search
USPC .......................... 358/1.14, 1.15; 399/8–10, 81
See application file for complete search history.

(56) References Cited

U.S. PATENT DOCUMENTS

| | | | | |
|---|---|---|---|---|
| 2002/0057455 | A1* | 5/2002 | Gotoh et al. | 358/1.15 |
| 2002/0126307 | A1* | 9/2002 | Ohwa | 358/1.14 |
| 2005/0243365 | A1* | 11/2005 | Noda | 358/1.15 |
| 2008/0059516 | A1* | 3/2008 | Cui et al. | 707/103 R |
| 2011/0013924 | A1* | 1/2011 | Hosoi | 399/83 |
| 2011/0134461 | A1* | 6/2011 | Kiuchi | 358/1.14 |
| 2011/0224816 | A1* | 9/2011 | Pereira | 700/100 |
| 2012/0062919 | A1* | 3/2012 | Hashimoto | 358/1.12 |
| 2012/0311586 | A1* | 12/2012 | Inagaki | 718/100 |
| 2014/0029047 | A1* | 1/2014 | Giannetti et al. | 358/1.15 |

FOREIGN PATENT DOCUMENTS

JP   A-2002-63004   2/2002

* cited by examiner

*Primary Examiner* — Benjamin O Dulaney
(74) *Attorney, Agent, or Firm* — Oliff PLC

(57) ABSTRACT

A printing system includes a first unit, a second unit, a third unit, and a display. The first unit stores start and end time of a printed job. The second unit stores start time of an in-progress print job and stores predicted end time calculated from attributes of the in-progress print job. The third unit stores predicted start and end time calculated from attributes of a ready-for-print job. The display indicates a mark representing current time, indicates a figure along a time axis on one side of the mark, representing an existence of the printed job from the start to end time, indicates a figure crossing the mark, representing an existence of the in-progress print job from the start to predicted end time, and indicates a figure on the other side of the mark, representing an existence of the ready-for-print job from the predicted start to end time.

9 Claims, 12 Drawing Sheets

FIG. 5

| JOB NAME | START TIME | END TIME | NUMBER OF PAGES | ppm CONVERSION | PRODUCTIVITY |
|---|---|---|---|---|---|
| J-1 | 12:45 | 12:55 | 380 | 38 ppm | 76% |
| J-2 | 13:00 | 13:25 | 500 | 20 ppm | 40% |
| J-3 | 13:30 | 13:50 | 900 | 45 ppm | 90% |

FIG. 10

| JOB NAME | START TIME | END TIME | PRINTING EXECUTION | INTERRUPTION DUE TO PRINTER ERROR | WAITING FOR INSERTION OF PAPER | WAITING FOR RIP |
|---|---|---|---|---|---|---|
| J-1 | 12:45 | 12:55 | 460 SECONDS (77%) | — | — | 140 SECONDS (23%) |
| J-2 | 13:00 | 13:25 | 670 SECONDS (45%) | 800 SECONDS (53%) | 50 SECONDS (2%) | — |
| J-3 | 13:30 | 13:50 | 1100 SECONDS (92%) | — | 100 SECONDS (8%) | — |

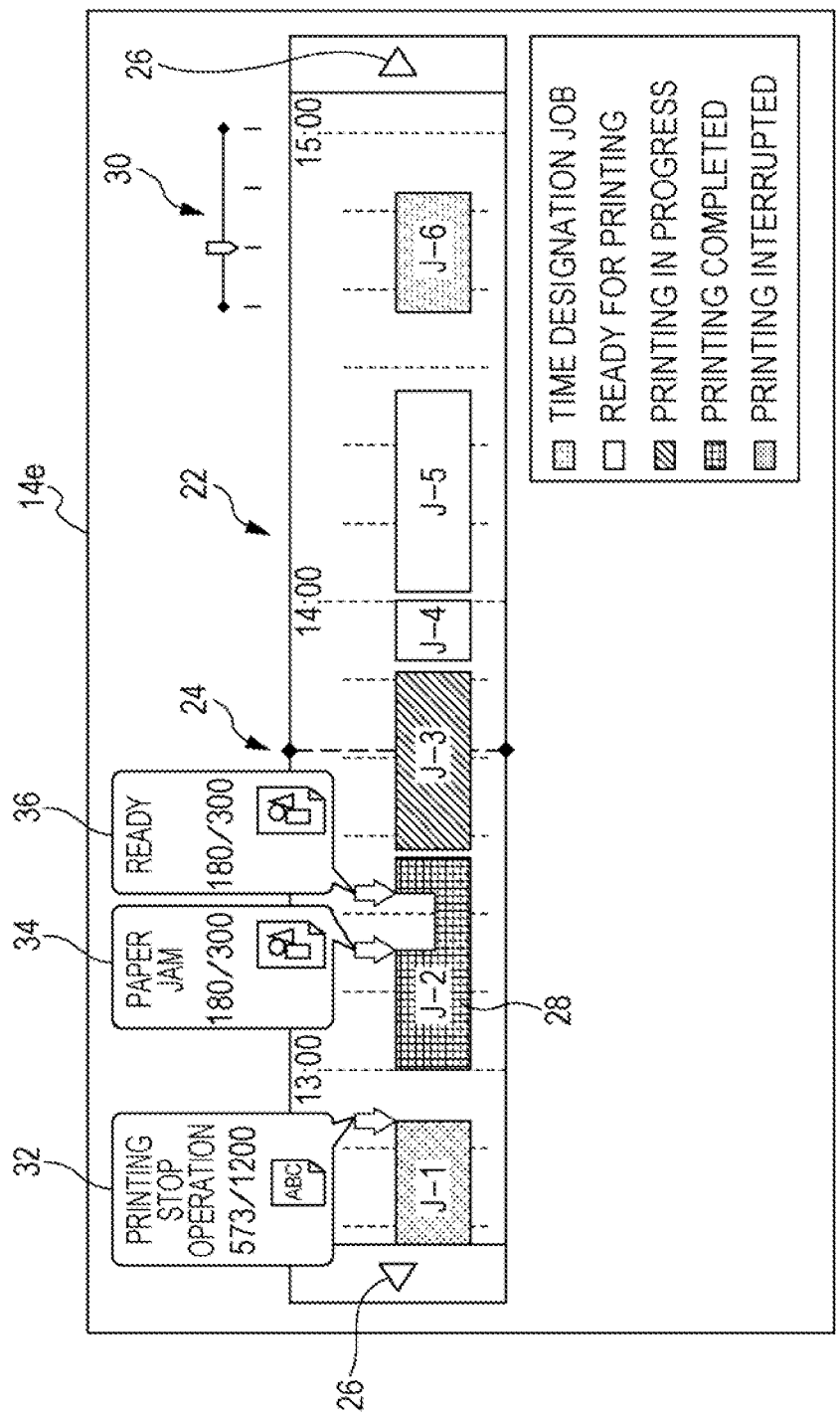

PRINTING SYSTEM FOR JOB SCHEDULING AND INDICATING PRINT JOB STATE

CROSS-REFERENCE TO RELATED APPLICATIONS

This application is based on and claims priority under 35 USC 119 from Japanese Patent Application No. 2013-126333 filed Jun. 17, 2013.

BACKGROUND (i) Technical Field

The present invention relates to a printing system and a print job state indication method.

(ii) Related Art

In printing industries, due date is established for individual printed materials, and managing the schedules of printing processes for printed materials in order to achieve efficient operation is demanded.

In actual printing, due to various causes including a device failure, such as paper jam, and replacement of consumables, such as toner or paper, printing is sometimes not performed on printing schedule. Under such circumstances, understanding how printing has actually been performed or why operation has not been completed on schedule is to be quickly done in terms of managing the printing process schedule.

Although a method for checking records of printing actually performed on the basis of record information indicated or printed on a text basis is suggested, it is difficult to instinctively understand the records since the record information is not on a graphical basis. Furthermore, understanding whether or not the intrinsic performance of a printer has been sufficiently exhibited or whether or not a factor for impeding printing efficiency exists is impossible by only indicating a printing result representing whether or not printing has been completed normally.

SUMMARY

According to an aspect of the invention, there is provided a printing system including a first unit, a second unit, a third unit, and a display. The first unit stores start time and end time of a printed job. The second unit stores start time of an in-progress print job and stores predicted end time that has been calculated on the basis of attributes of the in-progress print job. The third unit stores predicted start time and predicted end time that have been calculated on the basis of attributes of a ready-for-print job. The display indicates a mark representing current time, indicates a predetermined figure along a predetermined time axis on one side of the mark, representing an existence of the printed job from the start time to the end time, indicates a predetermined figure along the predetermined time axis so as to cross the mark, representing an existence of the in-progress print job from the start time to the predicted end time, and indicates a predetermined, figure along the predetermined time axis on the other side of the mark, representing an existence of the ready-for-print job from the predicted start time to the predicted end time.

BRIEF DESCRIPTION OF THE DRAWINGS

Exemplary embodiments of the present invention will be described in detail based on the following figures, wherein:

FIG. 5 is an explanatory diagram of productivity of jobs according to a second exemplary embodiment;

FIG. 10 is an explanatory diagram of print records according to a fifth exemplary embodiment;

FIG. 13 is an explanatory diagram of indication according to the sixth exemplary embodiment.

DETAILED DESCRIPTION

Hereinafter, exemplary embodiments of the present invention will be explained with reference to the drawings.

First Exemplary Embodiment

Figure 1:
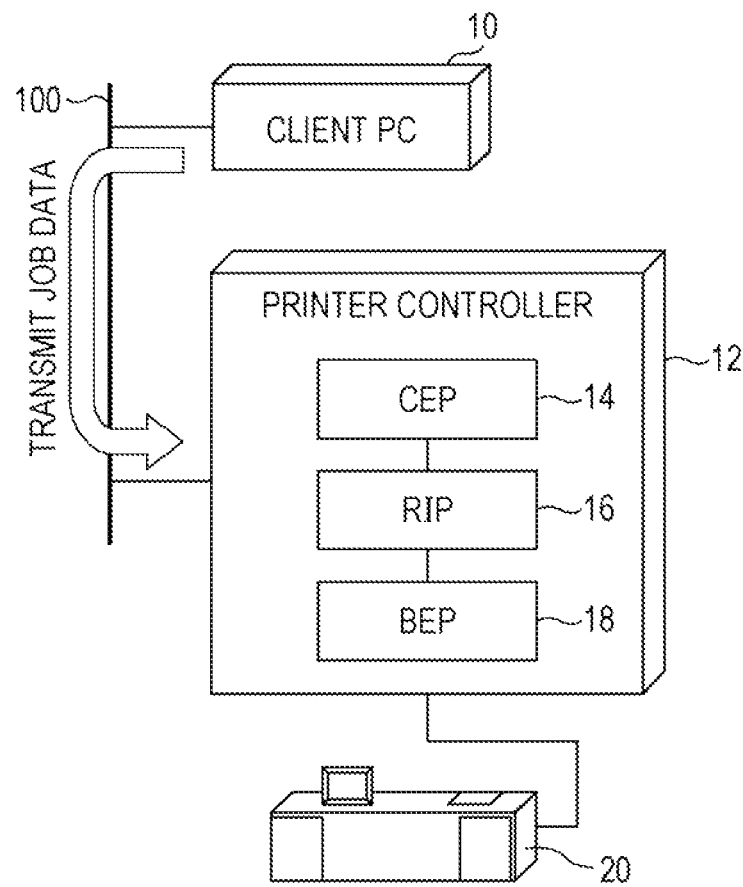
FIG. 1 is a schematic diagram of exemplary embodiments of the present invention.

FIG. 1 is a system configuration diagram of a printing system according to a first exemplary embodiment. The printing system includes a client PC 10, at printer controller 12, and a printer device 20. The printer controller 12 is connected to the client PC 10 via a network 100 and receives job data from the client PC 10.

The printer controller 12 includes three functional modules: a center processor (CEP) module 14; a raster image processor (RIP) module 16; and a back end processor (BEP) module 18. These modules are connected to one another via a communication line and transfer various data including job data.

The CEP module 14 receives job data from the client PC 10 and schedules the overall flow of printing processing. As described later, the CEP module 14 also indicates a scheduling result and print records on a display unit.

The RIP module 16 analyzes the contents of job data and converts the job data into image data in an appropriate format. More specifically, the RIP module 16 receives job data described in a page description language (PDL) transmitted from the client PC 10, and analyzes the PDL data to generate intermediate data representing an image. The intermediate data is data between PDL data and raster image data capable of being handled by the printer device 20. In general, PDL data represents an image as a set of rendering commands for each object forming the image. In contrast, raster image data represents an image as a set of pixels having a specific number of color values. Intermediate data is data of a granularity between PDL data and raster image data and represents an image as a set of sub-objects, which are obtained by dividing a PDL object into plural elements. For example, a sub-object is section data obtained by separating a PDL object (for example, a character font, a graphics diagram, or image data) by raster scanning lines. The section data represents a section in a scanning line occupied by an object and is represented by a pair of coordinates on both ends of the section. The section data includes information defining the pixel values of the pixels in the section. A pixel value represents density values of basic colors including cyan (C), magenta (M), yellow (Y), and black (K) used by printing engines. The RIP module 16 also communicates with the CEP module 14 and the BEP module 18 to schedule printing processing.

The BEP module 18 converts the intermediate data generated by the RIP module 16 into a form appropriate for the printer device 20, and transmits the converted data to the printer device 20. The BEP module 18 communicates with the CEP module 14 and the RIP module 16 to schedule printing processing.

The printer device 20 prints image data transmitted from the BEP module 18 on physical paper.

Figure 2:
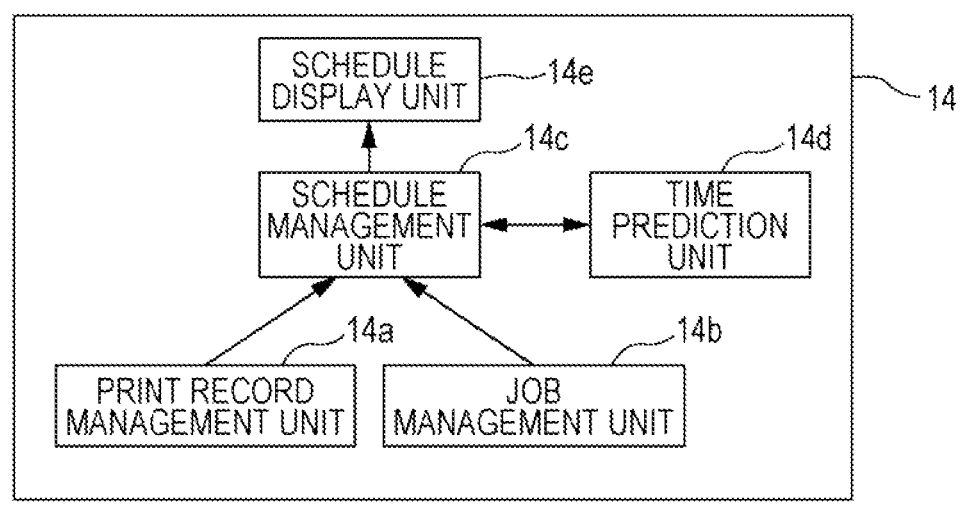
FIG. 2 is a functional block diagram in a first exemplary embodiment.

FIG. 2 is a functional block diagram of the CEP module 14. The CEP module 14 includes a print record management unit 14a, a job management unit 14b, a schedule management unit 14c, a time prediction unit 14d, and a schedule display unit 14e.

The print record management unit 14a stores start/end time of previous print jobs, printing status, and the like as records.

The job management unit 14b stores the status of valid jobs, printing order, and the attributes of jobs (paper size, the number of pages, etc.). When a job state changes, the job management unit 14b transmits to the print record management unit 14a and the schedule management unit 14c data indicating that the job state has changed. A change of a job state may be starting of the job, ending of the job, interruption of the job, or the like. When detecting that a job has started, the job management unit 14b transmits to the print record management unit 14a information indicating that the job has started. Using the information received from the job management unit 14b, the print record management unit 14a stores the start time of the job as a print record. Furthermore, when detecting that the job has been completed, the job management unit 14b transmits to the print record management unit 14a information indicating that the job has been completed. Using the information received from the job management unit 14b, the print record management unit 14a stores the end time of the job as a print record. Furthermore, detecting that the job has been interrupted, the job management unit 14b transmits to the print record management unit 14a information indicating that the job has been interrupted. Using the information received from the job management unit 14b, the print record management unit 14a stores the interruption time of the job as a print record. Starting, ending, interruption, and the like of a job are detected by receiving information transmitted from the RIP module 16, the BEP module 18, and the printer device 20. For example, interruption of a job is detected by receiving an interruption signal or a different type of error signal from the printer device 20.

The time prediction unit 14d calculates the prediction time for starting/ending of a job, on the basis of conditions including the current time, the attributes of the job, and the performance of the printer device 20. More specifically, for example, a time taken to perform printing is measured in advance for each job attribute and is stored as a table into a memory. The predicted time to be taken is calculated on the basis of the attributes of the job to be processed, by referring to the table. It is obvious that the relationship between a job attribute and a time to be taken may be defined in advance as a function so that a time to be taken corresponding to the attributes of the job to be processed is calculated using the function. Job attributes include paper size and the number of pages. The time to be taken increases as the paper size or the number of pages increases. The time to be taken is calculated on the assumption that the printer device 20 exhibits 100 percent of its capability. For example, in the case where the printer device 20 has a printing capability of 50 pieces of paper (conversion to A4-size paper) per minute, the time to be taken to complete a job is calculated on the assumption of the capability of 50 pieces of paper per minute. The start time of a job is calculated by adding a specific idle time to the predicted end time for the previous job. The end time of a job is calculated by adding the time to be taken to complete the job to the start time of the job.

The schedule management unit 14c acquires from the print record management unit 14a print job records within a time range subjected to schedule management, and stores the acquired print job records. Furthermore, the schedule management unit 14c acquires from the job management unit 14b the start time and the job attributes of the in-progress print job, stores the acquired start time and job attributes, and transmits the job attributes to the time prediction unit 14d. The schedule management unit 14c acquires from the time prediction unit 14d predicted end time, and stores the acquired predicted end time. Furthermore, the schedule management unit 14c acquires from the job management unit 14b the job attributes of a ready-for-print job, and transmits the acquired job attributes to the time prediction unit 14d. The schedule management unit 14c acquires from the time prediction unit 14d predicted start time and predicted end time, and stores the acquired predicted start time and predicted end time. Furthermore, the schedule management unit 14c receives a job state update information from the job management unit 14b. The schedule management unit 14c updates the schedule upon receiving the job state update information, and stores the updated schedule.

Accordingly, when a certain job is focused on, if the job is ready for printing, the schedule management unit 14c transmits the attributes of the job to the time prediction unit 14d and acquires predicted start time and predicted end time. When the job enters the in-progress state, the schedule management unit 14c acquires the start time (actual measurement) as a record. Furthermore, when the job is completed, the schedule management unit 14c acquires the end time (actual measurement) and the status of the job as a record. Eventually, in the case where a certain job is focused on, the processing described below is performed. When the job is ready for printing, the predicted start time and the predicted end time are stored in association with the job. When the job enters the in-progress state, the predicted start time, the predicted end time, and the start time (actual measurement) are stored in association with the job. When the job is completed, the predicted start time, the predicted end time, the start time (actual measurement), the end time (actual measurement), and the status are stored in association with the job.

The schedule display unit 14e indicates the schedules of jobs managed by the schedule management unit 14c in a graphical manner.

The functional blocks illustrated in FIG. 2 are formed of, specifically, one or more microprocessors and a memory. For example, a microprocessor may define the print record management unit 14a, the job management unit 14b, the schedule management unit 14c, and the time prediction unit 14d. The schedule display unit 14e may include a liquid crystal panel or an organic electroluminesence (EL) panel. The schedule display unit 14e may include a touch panel. The microprocessor functioning as the schedule management unit 14c acquires various data and stores the acquired data into the memory. The microprocessor stores schedule screen data on a video random access memory (VRAM) and displays the schedule screen data on the schedule display unit 14e. In the case where the schedule display unit 14e includes a touch panel, the schedule display unit 14e also functions as a user interface, and the schedule management unit 14c interprets user operation input via the schedule display unit 14e and controls the individual units.

Figure 3:
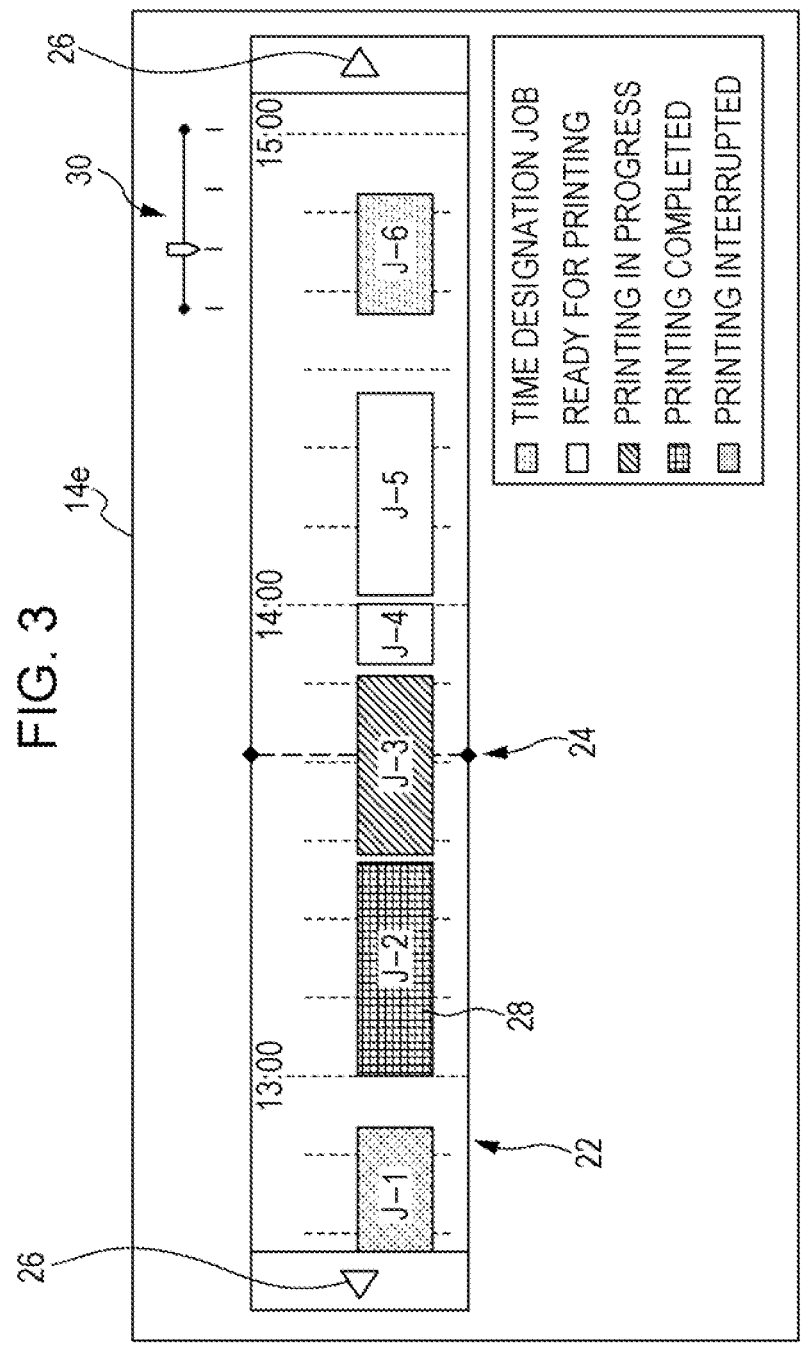
FIG. 3 is an explanatory diagram of indication according to the first exemplary embodiment.

FIG. 3 illustrates a schedule indication example of jobs indicated on the schedule display unit 14e. The jobs are indicated as rectangles arranged on the time axis. The status of a job is represented by the color or pattern of the corresponding rectangle. That is, a schedule indication area 22 is arranged in a specific position of toe schedule display unit 14e, the time axis is indicated along the horizontal direction of the schedule indication area 22, and the current time is indicated as a thick dotted line 24 at substantially the central portion of the schedule indication area 22. The jobs are indicated as rectangles 28. Printed jobs are indicated on the left of the current time, the in-progress print job is indicated so as to cross the current time, and ready-for-print jobs are indicated on the right of the current time. The start time (actual measurement) and the end time (actual measurement) of a printed job are indicated on both sides of a corresponding rectangle. Although data of the predicted start time and the predicted end time for a printed job that have been predicted by the time prediction unit 14d as described above is also stored in the schedule management unit 14c, a rectangle is indicated using the actually measured start time and end time, instead of the predicted times. Instead of predicted start time predicted by the time prediction unit 14d, the actually measured start time is indicated for an in-progress print job. However, predicted end time predicted by the time prediction unit 14d is indicated for the in-progress print job. In other words, for an in-progress print job, an actual measurement value is indicated on the left end of a corresponding rectangle and a predicted value is indicated on the right end of the corresponding rectangle. For a ready-for-print job, predicted start time and predicted end time that have been predicted by the time prediction unit 14d are indicated on ends of a corresponding rectangle.

Furthermore, triangle buttons 26 are indicated in left and right portions of the schedule indication area 22. Upon operating one of the buttons 26, the time indicated goes forward or backward. Furthermore, a trackbar 30 is indicated in an upper right portion of the schedule display unit 14e. By sliding the trackbar 30, the time scale is changed.

As described above, based on the current time, printed jobs, the in-progress print job, and ready-for-print jobs are collectively indicated. Thus, a user (operator) is able to easily understand which job has been completed, which job is in progress, and which job is ready for printing. For a printed job, since a rectangle representing the actual start time and end time is indicated, the user is able to instinctively understand the time taken to complete the job. For example, in the case where a rectangle for a job that is to be originally completed within about one hour spreads over a range indicating two hours, the user is able to instinctively understand the printing efficiency of the job was degraded due to some reason. For an in-progress print job, predicted end time that has been predicted by the time prediction unit 14d on the basis of the start time and the job attributes of the job is also indicated. Thus, the user is able to correctly understand when the in-progress print job ends. Also for a ready-for-print job, predicted start time and predicted end time that have been predicted by the time prediction unit 14d on the basis of the job attributes of the job are indicated. Thus, the user is able to correctly understand when the job starts and when the job ends.

In addition, as illustrated in FIG. 3, the status of a job is indicated using the color or pattern of a corresponding rectangle. The "printing interruption" status and the "time designation" status axe also indicated by specific colors or patterns. In FIG. 3, a job "J-1" is indicated by a pattern representing interruption of printing. Interruption of printing represents the state in which a corresponding job has been interrupted in the process of printing due to paper jam, replacement of consumables such as toner or paper, or the like. Interruption of printing is managed by the print record management unit 14a. The user is able to instinctively understand whether or not a job has been interrupted, on the basis of the color or pattern of a corresponding rectangle.

Figure 4:
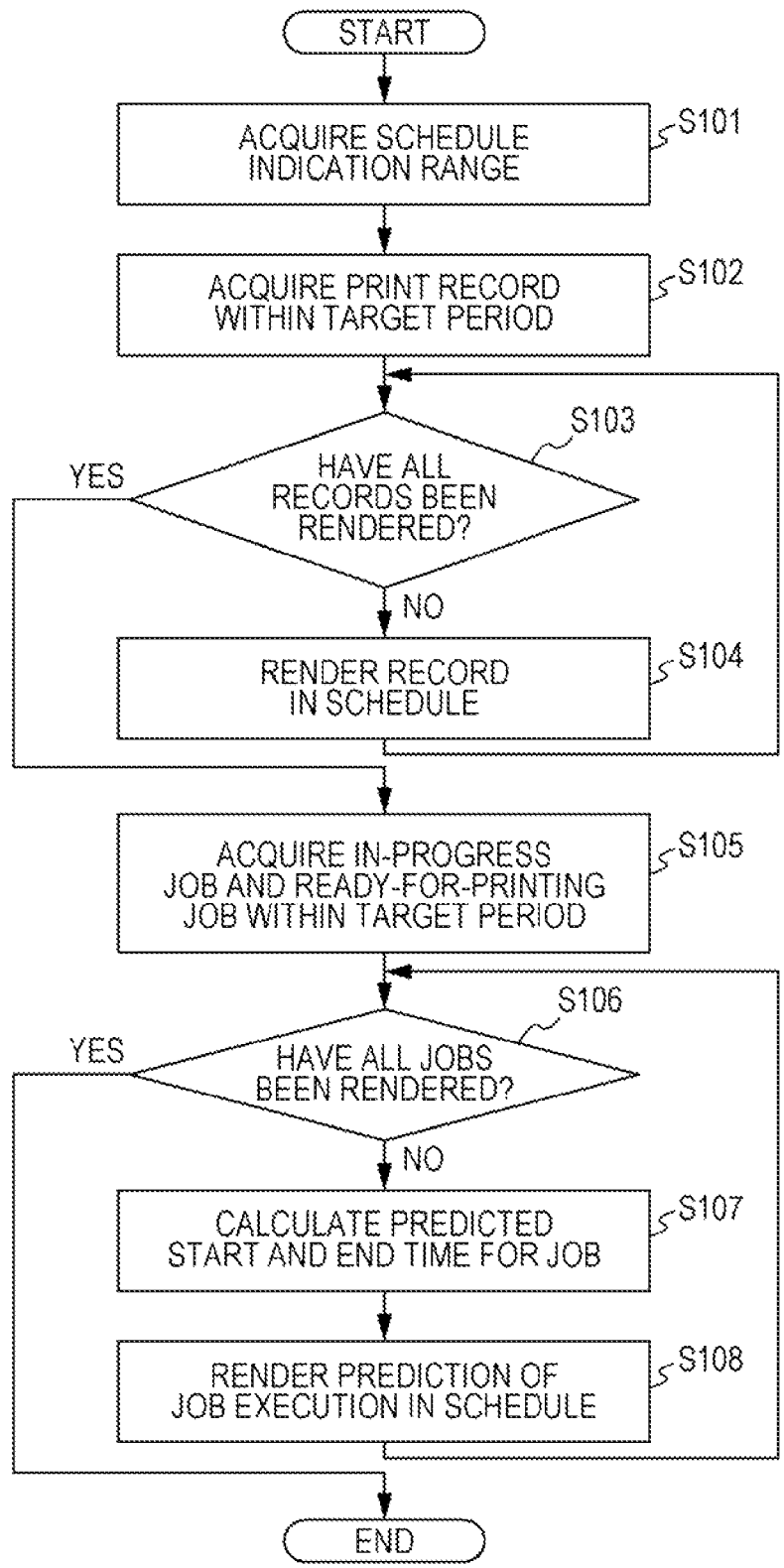
FIG. 4 is a flowchart illustrating a process performed in the first exemplary embodiment.

FIG. 4 illustrates a flowchart of an indication process according to the first exemplary embodiment, which is performed by the schedule management unit 14c.

The schedule management unit 14c first acquires a schedule indication range (S101). The schedule indication range is a time range and is, for example, 12:00 to 16:00.

Next, the schedule management unit 14c defines the indication range acquired in S101 as a target period, and acquires print records within the target period from the print record management unit 14a (S102).

The schedule management unit 14c determines whether or not a non-rendered record exists (S103). In the case where a non-rendered record exists (NO in S103), the schedule management unit 14c renders the record into the schedule (S104). For example, in the case where printed jobs J-1 and J-2 exist and neither the job J-1 nor job J-2 has been rendered, records of the jobs J-1 and J-2, that is, the start time, the end time, and the status of the jobs J-1 and J-2, are acquired from the print record management unit 14a and are indicated as rectangles on the schedule display unit 14e. The processing operations of S103 and S104 are repeatedly performed until there is no non-rendered record.

After rendering for ail the records is performed (in the above-mentioned example, after rendering for the jobs J-1 and J-2 is performed), the schedule management unit 14c acquires from the job management unit 14b the in-progress print job and ready-for-print jobs within the target period (S105).

Then, the schedule management unit 14c determines whether or not there is any acquired job that has not been rendered (S106). In the case where a non-rendered job exists (NO in S106), the schedule management unit 14c acquires from the time prediction unit 14d the predicted start time and the predicted end time for the job (S107). Then, the schedule management unit 14c indicates a corresponding rectangle on the schedule display unit 14e, on the basis of the acquired predicted start time and predicted end time (S108).

For the in-progress print job, since the actual measurement value exists as start time, predicted start time is not necessarily acquired.

Second Exemplary Embodiment

In the first exemplary embodiment, the start time, the end time, and the status of a printed job are indicated on the schedule display unit 14e. However, the printing efficiency of the printed job may further be indicated.

FIG. 5 illustrates an example of the start time, the end time, the number of pages, conversion to the number of pages per minute (ppm conversion), and the printing efficiency acquired for a printed job by the schedule management unit 14c. In the case where printed jobs J-1, J-2, and J-3 exist, the start time, the end time, the number of pages, ppm conversion, and the productivity as printing efficiency are acquired and stored for each job. The number of pages represents the number of pages of job attributes. The ppm conversion represents the number of printed pages per minute in the case where all the pages are printed within a time from the start time to the end time. The ppm conversions for the job J-1, the job J-2, and the job J-3 are calculated as 38 ppm, 20 ppm, and 45 ppm, respectively, and are stored. The productivity serving as printing efficiency represents the percentage of printing when the processing capability of the printer device 20 is set to 100. For example, in the case where the processing capability of the printer device 20 is 50 ppm, the productivities of the job J-1, the job J-2, and the job J-3 are calculated as 76%, 40%, and 90%, respectively, and are stored.

Figure 6:
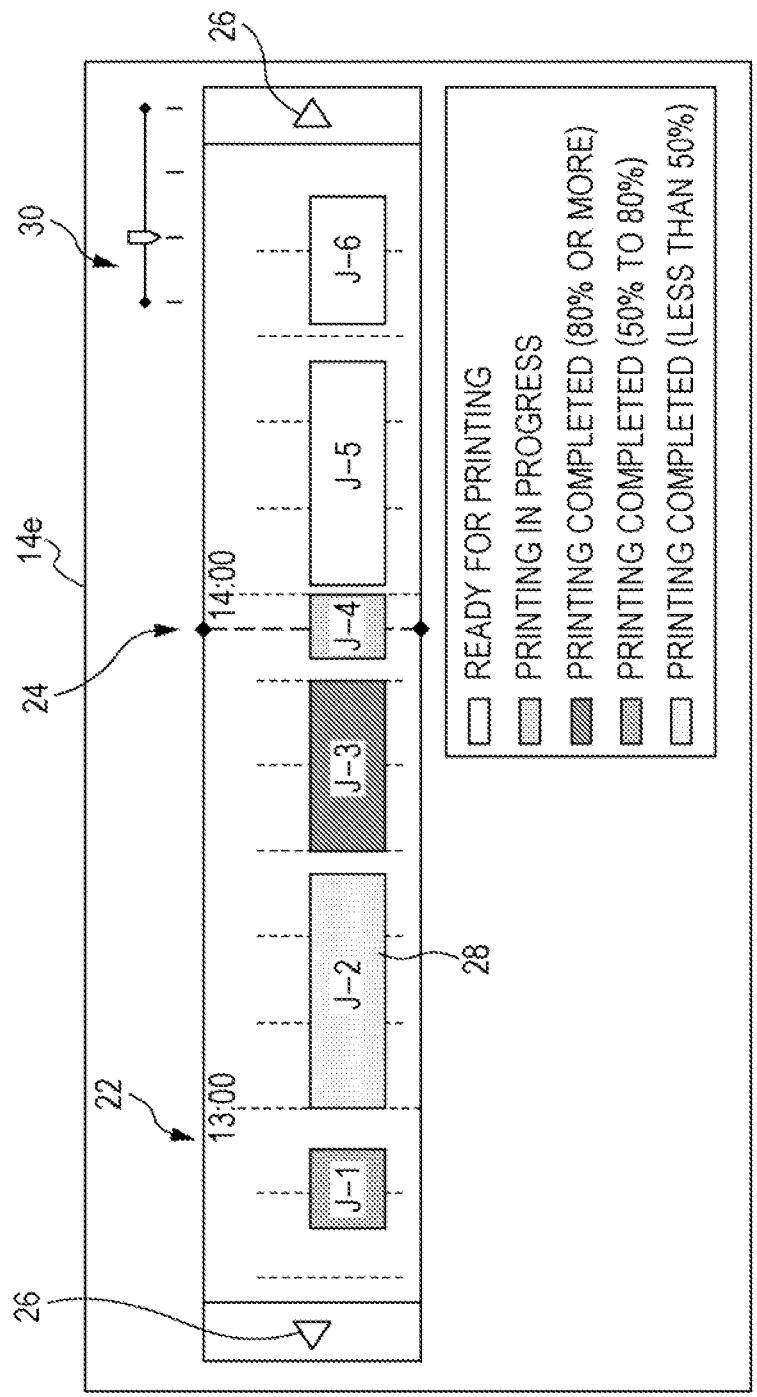
FIG. 6 is an explanatory diagram of indication according to the second exemplary embodiment.

FIG. 6 illustrates an indication example of the schedule display unit 14e according to the second exemplary embodiment. Regarding the printed jobs J-1, J-2, and J-3 positioned on the left of the current time represented by the thick dotted line 24, productivities are indicated in association with corresponding rectangles and are indicated by, specifically, colors of the rectangles. More specifically, a color A is applied when the productivity is lower than 50%, a color B is applied when the productivity is within a range between 50% and 30%, and a color C is applied when the productivity is higher than 80%. A user is able to easily understand the productivity of each job by visually recognizing the schedule indication described above. For example, since the productivity of the job J-2 is 40%, which is extremely low, the user is able to intensively consider measures to increase the productivity.

Figure 7:
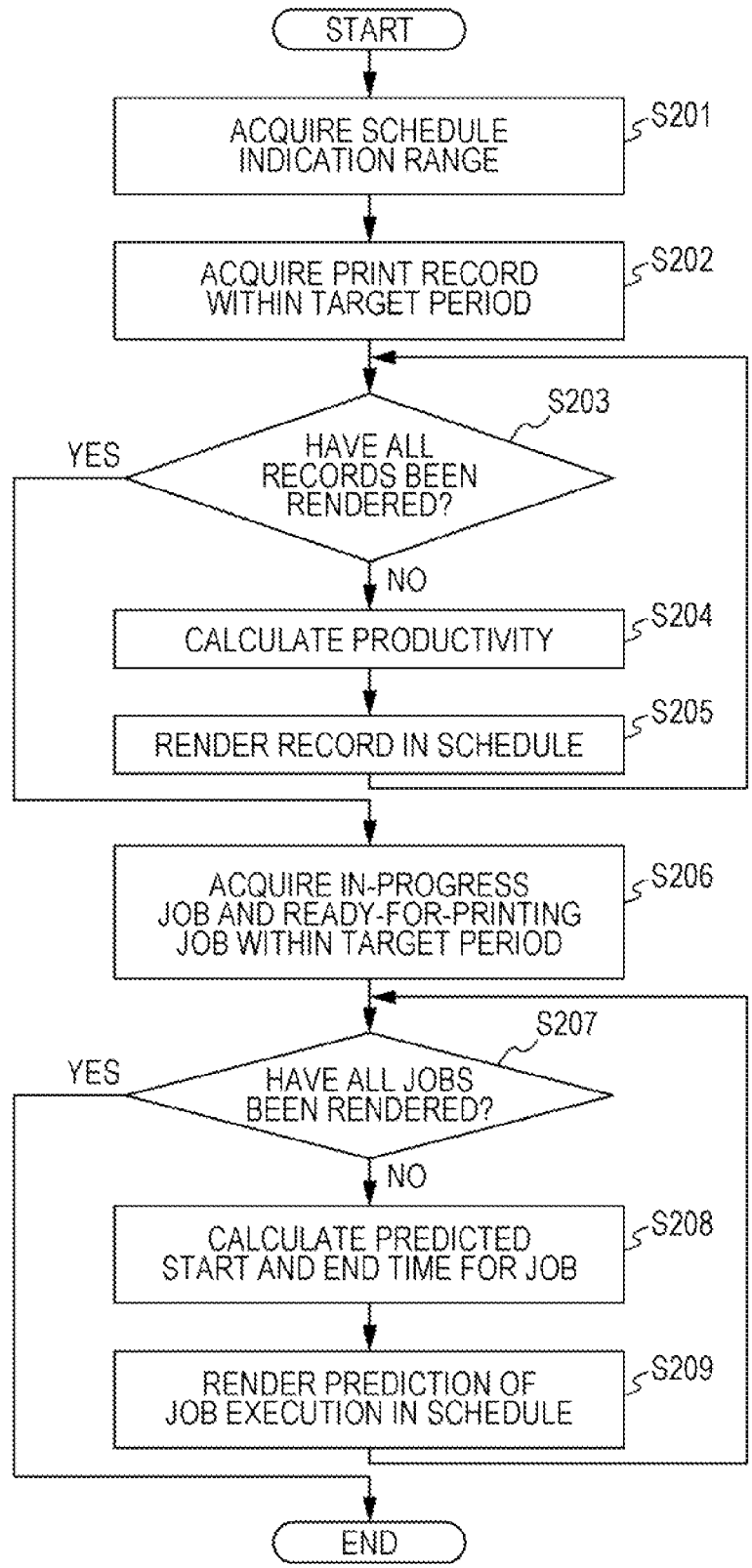
FIG. 7 is a flowchart of a process performed in the second exemplary embodiment.

FIG. 7 illustrates a flowchart of an indication process according to the second exemplary embodiment, which is performed by the schedule management unit 14c.

The schedule management unit 14c first acquires a schedule indication range (S201). The schedule indication range is a time range.

Then, the schedule management unit 14c defines the indication range acquired in S201 as a target period, and acquires from the print record management unit 14a print records within the target period (S202).

Then, the schedule management unit 14c determines whether or not a non-rendered record exists (S203). In the case where a non-rendered record exists (NO in S203), the schedule management unit 14c calculates the productivity of the record (S203). More specifically, the schedule management unit 14c obtains, for each job included in the record, ppm conversion for the number of printed pages, and calculates the productivity, which is in the form of percentage, by dividing the ppm conversion by the processing capability of the printer device 20 stored in advance. Then, the schedule management unit 14c renders the record into the schedule (S205). For example, in the case where printed jobs J-1 and J-2 exist and neither the job J-1 nor Job J-2 has been rendered, the schedule management unit 14c acquires from the print record management unit 14a records of the jobs J-1 and J-2, that is, the start time, the end time, and the status of the jobs J-1 and J-2, and indicates corresponding rectangles in colors corresponding to the calculated productivities on the schedule display unit 14e. For example, a lighter color is applied as the productivity decreases. Alternatively, for example, a more reddish color is applied as the productivity decreases. The processing operations of S203 to S205 are repeatedly performed until there is no non-rendered record.

After rendering for all the records is completed (in the example provided above, after rendering for the jobs J-1 and J-2 is completed), the schedule management unit 14c acquires from the job management unit 14b the in-progress print job and ready-for-print jobs within the target period (S206).

Then, the schedule management unit 14c determines whether or not there is any acquired job that has not been rendered (S207). In the case where there is a non-rendered job (NO in S207), the schedule management unit 14c acquires from the time prediction unit 14d the predicted start time and the predicted end time for the job (S208). The schedule management unit 14c indicates corresponding rectangles on the schedule display unit 14e, on the basis of the acquired predicted start time and predicted end time (S209).

Third Exemplary Embodiment

In the second exemplary embodiment, the productivity of a printed job is indicated by the color of a rectangle in association with the corresponding rectangle. However, the productivity may be indicated in association with a rectangle in a different manner.

Figure 8:
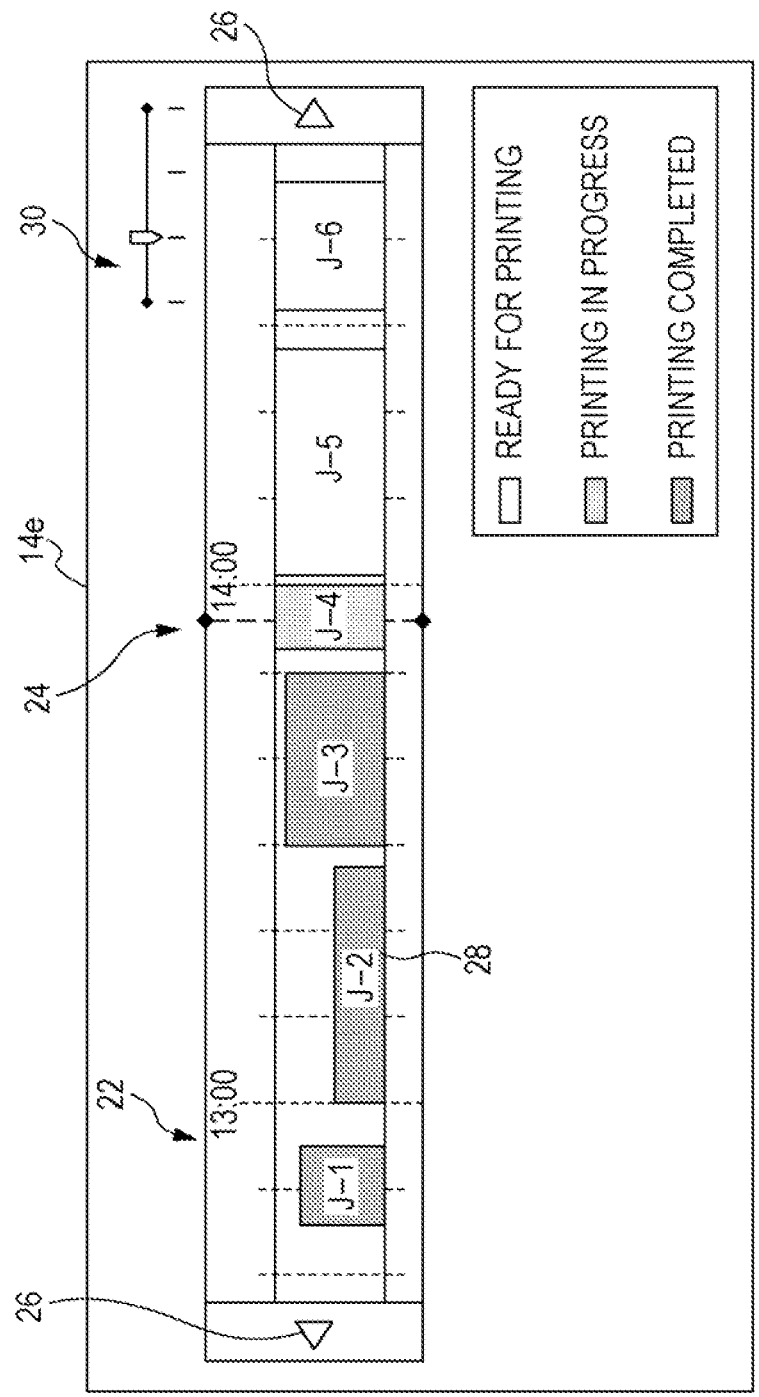
FIG. 8 is an explanatory diagram of indication according to a third exemplary embodiment.

FIG. 8 illustrates an indication example of the schedule display unit 14e according to a third exemplary embodiment. The schedule management unit 14c calculates the productivities of printed jobs J-1, J-2, and J-3, and indicates the calculated productivities as the heights of rectangles. In the case where the productivities of the jobs J-1, J-2, and J-3 are 76%, 40%, and 90%, respectively, the heights of the rectangles are set to be proportional to the productivities. Accordingly, a user is able to easily understand the productivity of a printed job from the height of a corresponding rectangle.

Fourth Exemplary Embodiment

In the third exemplary embodiment, the productivity of a printed job is indicated by the height of a corresponding rectangle. In addition to this, start time and end time based on the assumption that each job is printed at a productivity of 100% may be indicated in a superimposed manner.

Figure 9:
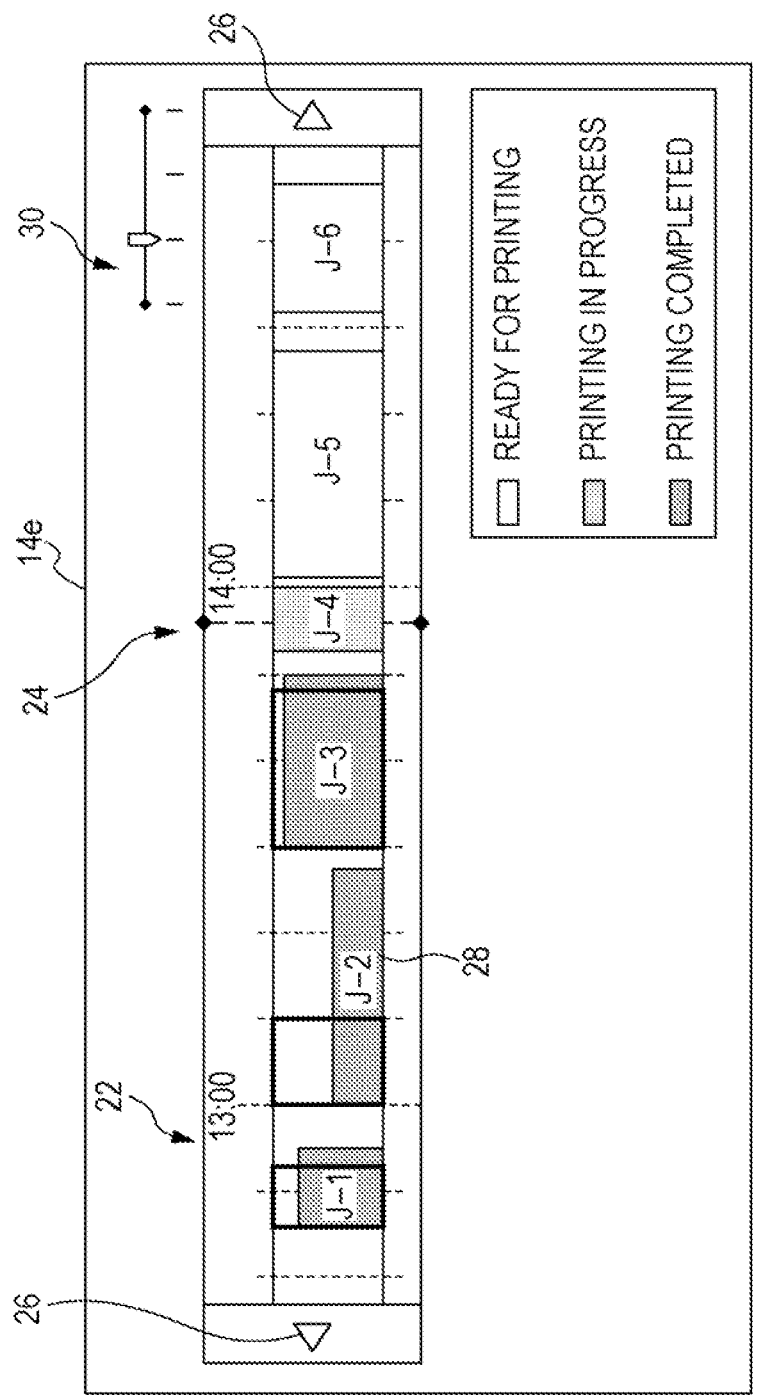
FIG. 9 is an explanatory diagram of indication according to a fourth exemplary embodiment.

FIG. 9 illustrates an indication example of the schedule display unit 14e according to a fourth exemplary embodiment. FIG. 9 is different from FIG. 8 in that, regarding the printed jobs J-1, J-2, and J-3, rectangles having heights corresponding to productivities are indicated and rectangles based on predicted start times and predicted end times that have been predicted on the assumption that the productivities are 100% are indicated using thick lines in a superimposed manner. A user is able to clearly understand a difference between the original productivity and the actual productivity by visually recognizing the rectangles based on a productivity of 100%.

A rectangle based on a productivity of 100% is not necessarily indicated using a thick line and may be indicated using any line such as a dotted line, a colored dotted line, or the like.

Furthermore, only a rectangle corresponding to the actual productivity may be indicated as illustrated in FIG. 8 in a default state and a rectangle based on a productivity of 100% may be indicated as illustrated in FIG. 9 in a superimposed manner in response to a selection operation by a user.

Fifth Exemplary Embodiment

In the foregoing exemplary embodiments, status and productivity are indicated by the color, pattern, and height of a rectangle. However, a more detailed status of each printed job may foe indicated, more specifically, a time from starting to ending of printing may be classified by the status of the printer device 20 into a time during which printing is being performed, a time during which the printer device 20 is stopped due to paper jam or the like, a time during which the printer device 20 is stopped due to out-of-paper, and the like and the percentages of the classified times may be indicated so as to be stacked in the height direction of a rectangle.

FIG. 10 illustrates an example of the star time, the end time, the printing execution time, a stop time due to a failure of the printer device 20, a stop time due to out-of-paper, an RIP wait time for each of the printed jobs J-1, J-2, and J-3.

For example, for the job J-1, it is assumed that the printing execution time is 460 seconds, printing is not stopped due to printer failure or out-of-paper, and the RIP wait time is 140 seconds. In this case, the percentages of the printing execution time and the HIP wait time in the entire processing time are 77% and 23%, respectively. Here, the RIP wait time represents a time during which processing of the printer device 20 is waited since RIP processing takes a long time and the RIP processing speed does not follow the output speed of the printer device 20. In the case where RIP processing may be performed prior to printing of a job (pre-RIP), the wait time in this case may be included in the RIP wait time. For the job J-2, it is assumed that the printing execution time is 670 seconds, the printing stop time due to printer failure is 800 seconds, and the printing stop time due to out-of-paper is 50 seconds. In this case, the percentage of the printing execution time, the stop time due to printer failure, and the stop time due to out-of-paper in the entire processing time are 45%, 53%, and 2%, respectively.

Figure 11:
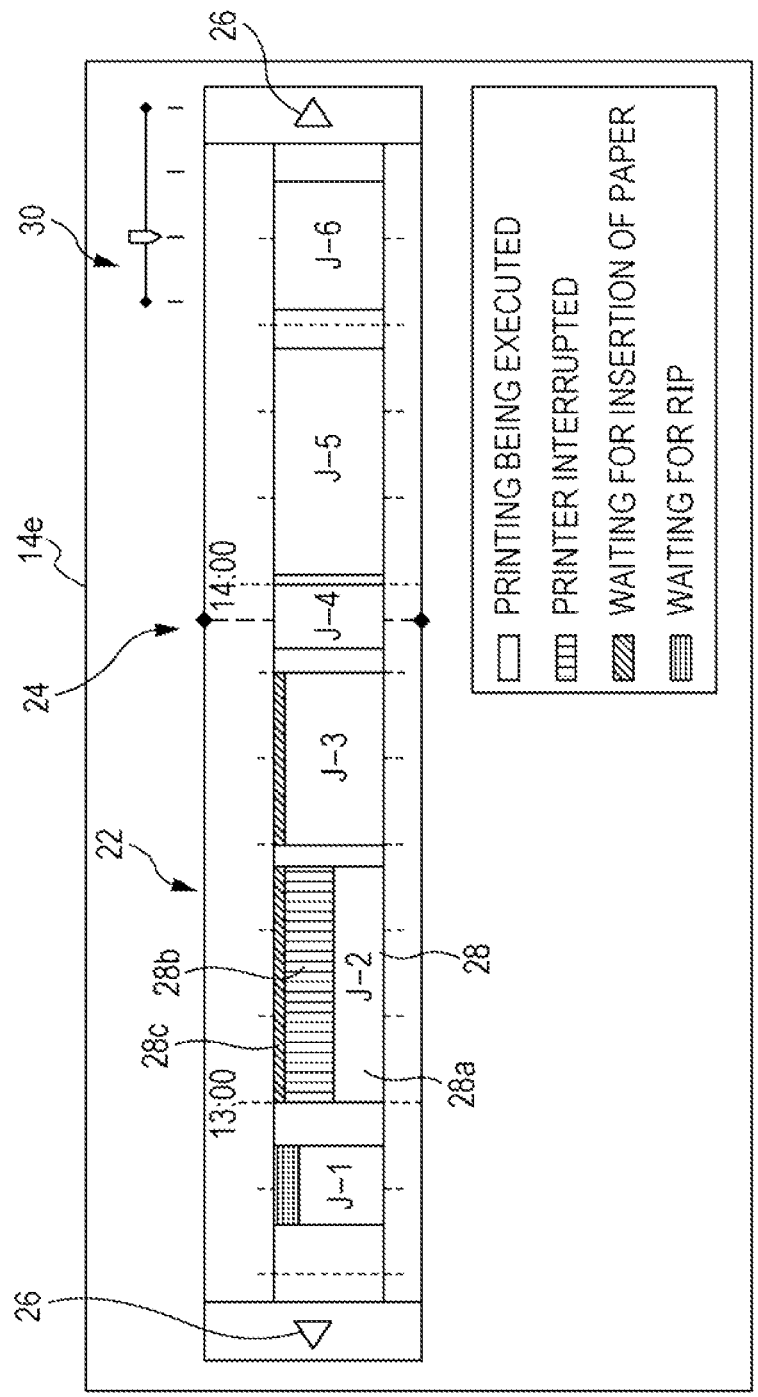
FIG. 11 is an explanatory diagram of indication according to the fifth exemplary embodiment.

FIG. 11 illustrates an indication example of the schedule display unit 14e according to a fifth exemplary embodiment. For the print jobs J-1, J-2, and J-3, percentages of the printing execution time, the printer stop time, the wait time for paper insertion, the RIP wait time are indicated so as to be stacked in the height direction of rectangles. For example, when the job J-2 is focused on, the percentages of a printing execution time 28a, a printer stop time 28b, and a wait time for paper insertion 28c are indicated with corresponding percentages in a stacked manner. Although the individual times are indicated in different patterns in FIG. 11, they may be indicated in different colors. For example, the printing execution time, the printer stop time, the wait time for paper insertion, and the RIP wait time may be indicated in blue, red, yellow, and green, respectively.

By indicating a rectangle for each job in such a manner that the percentages of the statuses of the job from starting to ending thereof are stacked as described above, a user is able to instinctively understand the state of the job in detail.

Sixth Exemplary Embodiment

Figure 12:
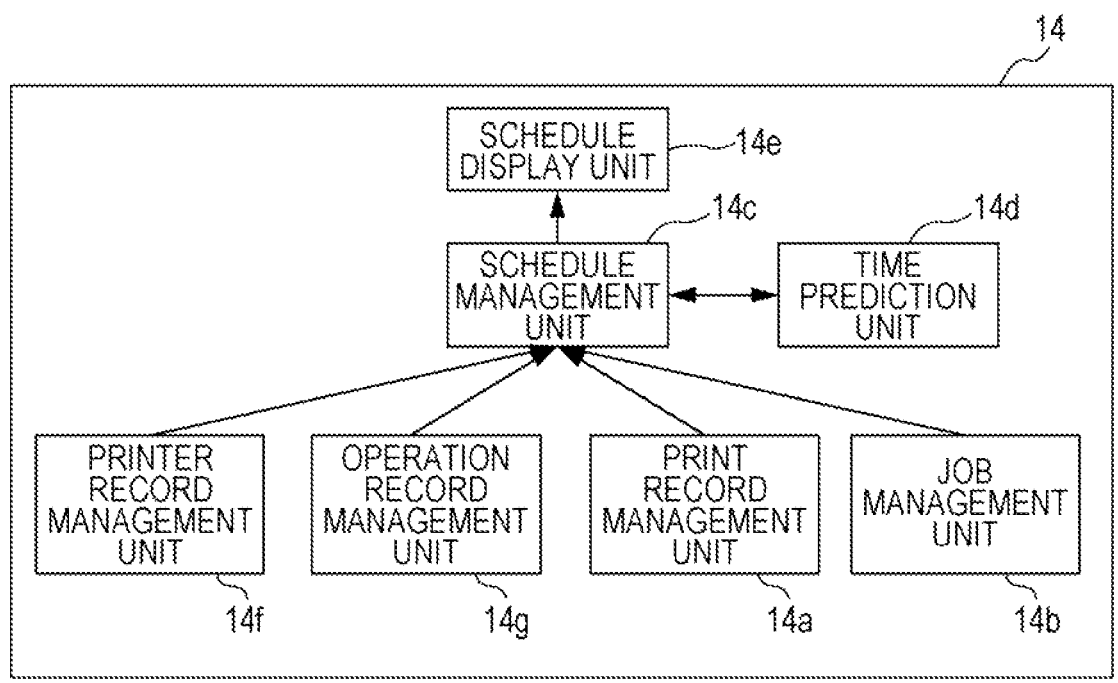
FIG. 12 is a functional block diagram in a sixth exemplary embodiment.

FIG. 12 is a functional block diagram of the CEP module 14 according to a sixth exemplary embodiment. In FIG. 12, in addition to the configuration illustrated in FIG. 2, the CEP module 14 further includes a printer record management unit 14f and an operation record management unit 14g.

The printer record management unit 14f manages records such as paper jam, out-of-paper, and the like occurred in the printer device 20. In the case where printing processing is being performed when an event occurs, the progress status of a job at that time is also managed by the printer record management unit 14f.

The operation record management unit 14g manages records of operations performed by a user (operator) via a user interface. In the case where printing processing is being performed when an operation is performed, the progress status of a job at that time is also managed by the operation record management unit 14g.

As in the first exemplary embodiment, the schedule management unit 14c acquires from the print record management unit 14a records of print jobs within a time range subjected to schedule management. Furthermore, the schedule management unit 14c acquires from the job management unit 14b the start time and the job attributes of the in-progress print job, and transmits the acquired job attributes to the time prediction unit 14d. Then, the schedule management unit 14c acquires from the time prediction unit 14d the predicted end time for the in-progress print job. The schedule management unit 14c also acquires from the job management unit 14b the job attributes of ready-for-print jobs, and transmits the acquired job attributes to the time prediction unit 14d. Then, the schedule management unit 14c acquires from the time prediction unit 14d the predicted start time and predicted end time for the ready-for-print jobs. Furthermore, the schedule management unit 14c receives update information on the job state from the job management unit 14b. Upon receiving the update information, the schedule management unit 14c updates the schedule.

The schedule management unit 14c also acquires from the printer record management unit 14f records of a printer within the time range subjected to schedule management, and acquires from the operation record management unit 14g records of operations within the time range subjected to schedule management.

As in the first exemplary embodiment, the schedule display unit 14e indicates the schedule of individual jobs managed by the schedule management unit 14c in a graphical manner. At this time, records of the printer and records of operations acquired by the schedule management unit 14c are also graphically indicated in a superimposed manner on the schedule display unit 14e.

Similar to the functional blocks illustrated in FIG. 2, the functional blocks illustrated in FIG. 13 are formed of, specifically, one or more microprocessors and a memory. For example, a microprocessor may define the print record management unit 14a, the job management unit 14b, the schedule management unit 14c, the time prediction unit 14d, the printer record management unit 14f, and the operation record management unit 14g. The schedule display unit 14e may include a liquid crystal panel or an organic EL panel. The schedule display unit 14e may include a touch panel. The microprocessor functioning as the schedule management unit 14c acquires various data and stores the acquired data into the memory. The microprocessor stores schedule screen data on a VRAM and displays the schedule screen data on the schedule display unit 14e. In the case where the schedule display unit 14e includes a touch panel, the schedule display unit 14e also functions as a user interface. The operation record management unit 14g stores into the memory a user operation input via the schedule display unit 14e. The operation record management unit 14g also stores into the memory a user operation transmitted from the client PC 10 as an operation record.

FIG. 13 illustrates an indication example of the schedule display unit 14e according to the sixth exemplary embodiment. Printed jobs are indicated in the form of rectangle on the left of the current time represented by the dotted line 24, the in-progress print job is indicated in the form of rectangle so as to cross the current time, and ready-for-print jobs are indicated in the form of rectangle on the right of the current time.

For a printed job, the period during which the printer device 20 is stopped is indicated in such manner that the height of a rectangle is lower than normal (half the normal height). For example, when a job J-2 in FIG. 13 is focused on, the height of part of a rectangle is indicated so as to be half the normal height, which represents that the printer device 20 is stopped during this period. By indicating stoppage of the printer device 20 by the neighs of the rectangle, a user is able to instinctively understand the reduction in the productivity and a cause of the reduction.

Furthermore, balloons 32, 34, and 36 provided with downward arrows are indicated above rectangles for the printed jobs J-1 and J-2, and the fact that printer records or operation records exist at the timings indicated by the downward arrows is indicated. For example, the balloons 32, 34, and 36 represent that a printing stop operation was performed at the end time of the job J-1, and paper jam and execution of a ready operation occurred within the processing of the job J-2.

In the balloon 32 provided with a downward arrow, the value "573/1200" is indicated. This value represents the timing at which a printing stop operation was performed, and more specifically, that a printing stop operation was performed at page 573 in 1200 pages. At the time of storing an operation record into the memory, the operation record management unit 14g also stores information indicating at which timing the operation was performed. An example of an operation timing may be identified by the page number in the total number of pages at which the operation was performed. Furthermore; as illustrated in FIG. 13, the page at which an operation was performed may also be indicated as a thumbnail image. The same applies to the balloons 34 and 36. The printer record management unit 14f also identifies the timing at which a printer failure occurred by the page number at which the failure occurred in the total number of pages.

As described above, by graphically indicating printer records and operation records in association with rectangles of corresponding jobs, a user is able to instinctively understand the progress status of each job and an event (printer failure or operation details) which occurred in the process of the job.

The present invention is not limited to the exemplary embodiments explained above and various modifications may be made to the present inversion.

For example, the productivity of a printed job that is calculated and is indicated in a graphical manner in each of the foregoing exemplary embodiments represents the average value of the period from the job start time to the job end time. In contrast, the productivity may be calculated every time and may be indicated in real time. In this case, the productivity calculated in real time may be indicated by the color or height of a rectangle.

Furthermore, on the basis of the productivity of each job calculated in each of the foregoing exemplary embodiments, in the case where a job similar to the job exists, the schedule management unit 14c is capable of performing rescheduling on the basis of the productivity of the job. For example, in the case where the productivity of a job J is 50% or less, which is low, when a job whose attributes are similar to those of the job J exists among jobs to be processed, it is predicted that the productivity of the similar job is also low. Thus, rescheduling for the similar job, such as postponing or moving the processing to a time period for which there is relatively little problem even if the productivity is low, may be performed.

An example of the case in which only one printer device 20 is connected is provided in each of the foregoing exemplary embodiments. However, in the case where plural printer devices 20 are connected, the progress statuses of jobs printed by the printer devices 20 may be graphically indicated in parallel on the schedule display unit 14e.

In the foregoing exemplary embodiments, printed jobs are indicated as rectangles on the left of the current time, the in-progress print job is indicated as a rectangle so as to cross the current time, and ready-for-print jobs are indicated as rectangles on the right of the current time. In contrast, however, printed jobs and ready-for-print jobs may be indicated on the right and left of the current time, respectively. Furthermore, instead of being indicated on the left and right of the current time, printed jobs and ready-for-print jobs may be indicated above or below the current time. For example, printed job may be indicated as rectangles below the current time, the in-progress print job may be indicated as a rectangle so as to cross the current time, and ready-for-print jobs may be indicated as rectangles above the current time. In conclusion, based on a mark representing the current time, printed jobs may be indicated on one side of the mark, the in-progress print job may be indicated so as to cross the mark, and ready-for-print jobs may be indicated on the other side of the mark. A mark representing the current time is not necessarily indicated as a dotted line as in the foregoing exemplary embodiments and may be indicated in the form of any figure. Each job is not necessarily indicated as a rectangle and any figure may be adopted as long as the figure is arranged from the start time to the end time or from the predicted start time to the predicted end time. For example, such a figure may be an oval, an arrow, or the like. The figure is not necessarily two dimensional and may be three dimensional.

Furthermore, although the productivity serving as printing efficiency is graphically indicated by the color and height of a rectangle in the foregoing exemplary embodiments, the printing efficiency may be indicated in any form, such as the pattern or the shape of the rectangle. In conclusion, the printing efficiency of a printed job may be indicated in association with a rectangle for the job.

Furthermore, although a printer record and an operation record are indicated on the schedule display unit 14e in the sixth exemplary embodiment, only a printer record or an operation record may be indicated. Even in this case, by indicating a printer record or an operation record in association with the printing efficiency, a user is able to instinctively understand a reduction in the printing efficiency and a cause of the reduction.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
 a first unit that stores start time and end time of a printed job;
 a second unit that stores start time of an in-progress print job and that stores predicted end time that has been calculated on the basis of attributes of the in-progress print job;
 a third unit that stores predicted start time and predicted end time that have been calculated on the basis of attributes of a ready-for-print job;
 a display that indicates a mark representing current time, that indicates a predetermined figure along a predetermined time axis on one side of the mark, representing an existence of the printed job from the start time to the end time, that indicates a predetermined figure along the predetermined time axis so as to cross the mark, representing an existence of the in-progress print job from the start time to the predicted end time, and that indicates a predetermined figure along the predetermined time axis on the other side of the mark, representing an existence of the ready-for-print job from the predicted start time to the predicted end time; and a unit that calculates and stores a printing efficiency of the printed job, wherein the display indicates the printing efficiency of the printed job incorporated into the predetermined figure for the printed job, and a height of the predetermined figure corresponds to a determined efficiency of the respective printed job.

2. The printing system according to claim 1, further comprising:

a unit that stores predicted start time and predicted end time of the printed job that have been calculated on the basis of attributes of the printed job, wherein the display indicates the printing efficiency and a predetermined figure representing the existence of the printed job from the predicted start time to the predicted end time.

3. The printing system according to claim 1, further comprising:

a unit that stores a print record of the printed job, wherein the display indicates records forming the print record of the printed job, in association with at least one of the predetermined figures.

4. The printing system according to claim 3, wherein in a case where the print record includes interruption of printing, the display indicates the interruption of printing in association with at least one of the predetermined figures.

5. The printing system according to claim 1, further comprising:

a unit that calculates and stores printing efficiencies of the printed job in a chronological order, wherein the display indicates the printing efficiencies of the printed job in association with at least one of the predetermined figures in the chronological order.

6. The printing system according to claim 5, further comprising:

a unit that stores predicted start time and predicted end time of the printed job that have been calculated on the basis of attributes of the printed job, wherein the display indicates the printing efficiencies and the predetermined figure that represents the existence of the printed job from the predicted start time to the predicted end time.

7. The printing system according to claim 1, further comprising:

a unit that stores at least one of a printer record and an operation record of the printed job, wherein the display indicates the at least one of the printer record and the operation record in association with the predetermined figure.

8. The printing system according to claim 7, wherein the display indicates timing at which the at least one of the printer record and the operation record occurred by a number of a corresponding page in a total number of pages.

9. A print job state indication method comprising:

storing start time and end time of a printed job;

storing start time of an in-progress print job and storing predicted end time that has been calculated on the basis of attributes of the in-progress print job;

storing predicted start time and predicted end time that have been calculated on the basis of attributes of a ready-for-print job;

indicating a mark representing current time, indicating a predetermined figure along a predetermined time axis on one side of the mark, representing an existence of the printed job from the start time to the end time, indicating a predetermined figure along the predetermined time axis so as to cross the mark, representing an existence of the in-progress print job from the start time to the predicted end time, and indicating a predetermined figure along the predetermined time axis on the other side of the mark, representing an existence of the ready-for-print job from the predicted start time to the predicted end time; and calculating and storing a printing efficiency of the printed job, wherein a display indicates the printing efficiency of the printed job incorporated into the predetermined figure for the printed job, and a height of the predetermined figure corresponds to a determined efficiency of the respective printed job.

* * * * *